United States Patent
Famous (10) Patent No.: US 9,888,119 B2
(45) Date of Patent: Feb. 6, 2018

(54) CONTACTS SERVICE FOR CALL CENTER

(71) Applicant: Cisco Technology, Inc., San Jose, CA (US)

(72) Inventor: Tod Famous, Ayer, MA (US)

(73) Assignee: Cisco Technology, Inc., San Jose, CA (US)

( * ) Notice: Subject to any disclaimer, the term of this patent is extended or adjusted under 35 U.S.C. 154(b) by 293 days.

(21) Appl. No.: 14/197,374

(22) Filed: Mar. 5, 2014

(65) Prior Publication Data

US 2015/0256676 A1    Sep. 10, 2015

(51) Int. Cl.
*H04M 3/00* (2006.01)
*H04M 3/51* (2006.01)
*H04M 3/42* (2006.01)

(52) U.S. Cl.
CPC ..... *H04M 3/5191* (2013.01); *H04M 3/42068* (2013.01); *H04M 2203/655* (2013.01)

(58) Field of Classification Search
CPC ................. H04M 3/5191; H04M 2203/655
USPC ....... 379/265.01–265.14, 266.01–266.1, 309
See application file for complete search history.

(56) References Cited

U.S. PATENT DOCUMENTS

| | | | |
|---|---|---|---|
| 8,345,851 B2 | 1/2013 | Vadlakonda et al. | |
| 8,416,939 B1* | 4/2013 | Pino | H04M 3/4285 379/211.01 |
| 8,503,989 B2 | 8/2013 | Kasturi et al. | |
| 8,532,280 B2 | 9/2013 | Ross et al. | |
| 8,607,308 B1* | 12/2013 | Langford | G06F 21/6218 705/1.1 |
| 8,627,210 B2 | 1/2014 | Vijayakumar et al. | |
| 8,630,610 B2 | 1/2014 | Shaffer et al. | |
| 8,805,951 B1* | 8/2014 | Faibish | G06F 9/5072 709/213 |
| 2010/0027778 A1* | 2/2010 | Kumar et al. | 379/265.09 |
| 2010/0169159 A1* | 7/2010 | Rose et al. | 705/10 |
| 2010/0329437 A1* | 12/2010 | Jeffs | H04M 15/00 379/112.06 |
| 2011/0123015 A1* | 5/2011 | Erhart et al. | 379/265.02 |
| 2012/0166345 A1* | 6/2012 | Klemm | 705/304 |
| 2012/0265328 A1 | 10/2012 | Kadirkamanathan et al. | |
| 2012/0303659 A1* | 11/2012 | Erhart | H04L 29/12594 707/769 |

(Continued)

OTHER PUBLICATIONS

Wikipedia, "Personal information manager", https://en.wikipedia.org/wiki/Personal_information_manager, last accessed Jun. 20, 2017, 2 pages.

(Continued)

*Primary Examiner* — William Deane, Jr.

(57) ABSTRACT

In one implementation, a cloud service server supplements one or more call centers or data centers. The cloud service server receives a customer identification value from a call center, which may include a phone number or an address for the customer. The cloud service server generates a profile request for one or more social networking services for profile information based on the customer identification value and sends the profile information to the call center. The call center returns customer context data from the call center associated with the customer. The cloud service server stores the customer context data and the profile information in associated with the customer identification value.

19 Claims, 8 Drawing Sheets

(56) References Cited

U.S. PATENT DOCUMENTS

| | | | |
|---|---|---|---|
| 2013/0060856 A1* | 3/2013 | Fried | G06Q 10/10 709/204 |
| 2013/0139241 A1* | 5/2013 | Leeder | 726/9 |
| 2013/0232159 A1* | 9/2013 | Daya | G06Q 50/01 707/758 |
| 2013/0254170 A1* | 9/2013 | Erhart | H04L 29/12594 707/692 |
| 2013/0346546 A1 | 12/2013 | Jung | |
| 2014/0044246 A1 | 2/2014 | Klemm et al. | |
| 2014/0171064 A1 | 6/2014 | Das | |
| 2014/0208384 A1* | 7/2014 | Youssefian | H04L 63/0869 726/3 |
| 2014/0247936 A1* | 9/2014 | Shtilman | G06Q 10/10 379/265.03 |
| 2015/0058302 A1* | 2/2015 | Abney, III | G06F 17/30371 707/692 |
| 2015/0193458 A1 | 7/2015 | Parekh et al. | |
| 2015/0207938 A1* | 7/2015 | Shaffer | H04M 3/5233 379/265.12 |
| 2015/0324375 A1 | 11/2015 | Lineberger | |
| 2016/0042371 A1* | 2/2016 | Klemm | G06Q 30/0203 705/7.32 |
| 2016/0173694 A1* | 6/2016 | D'Arcy | H04M 3/5232 379/265.03 |
| 2016/0182502 A1 | 6/2016 | Smith et al. | |
| 2016/0198047 A1* | 7/2016 | McCormack | H04M 3/5175 379/265.09 |
| 2016/0292700 A1* | 10/2016 | Gopal | G06Q 30/0201 |
| 2017/0142128 A1* | 5/2017 | McCormack | H04L 63/108 |

OTHER PUBLICATIONS

"Track your communications with customers in Business Contact Manager", http://office.microsoft.com/en-us/outlook-help/track-your-communications-with-customers-in-business-contact-manager-HP010262534.aspx, Microsoft, last accessed Jun. 20, 2017, 16 pages.

* cited by examiner

CONTACTS SERVICE FOR CALL CENTER

TECHNICAL FIELD

This disclosure relates in general to the field of call centers, and more particularly, to a cloud-based contacts service that permits posting of contact center context.

BACKGROUND

A call center may include multiple call agents and communication devices for fielding customer service requests. The customer service requests may be related to technical service, product sales, or other customer service. A customer relationship management (CRM) system may include a database to retain business records for the customer service requests. For example, a utility company may record in a database each time a particular customer calls the utility company, and a pizza restaurant may record in a database a description of a food order as orders are placed.

However, both the utility company and the pizza restaurant utilize systems tightly coupled to their business processes, which are typically expensive to implement and difficult to maintain. These systems are slow to adapt to changes in the business processes.

BRIEF DESCRIPTION OF THE DRAWINGS

Exemplary embodiments of the present embodiments are described herein with reference to the following drawings.

DESCRIPTION OF EXAMPLE EMBODIMENTS

Overview

In one embodiment, a cloud service server receives a customer identification value from a call center and generates a profile request for one or more social networking services for profile information based on the customer identification value. The profile information is sent to the call center and customer context data is received in response from the call center. The cloud service server may store the customer context data and the profile information in a memory and associated with the customer identification value.

In another embodiment, a call center receives a request for customer service The request includes a customer identification value. The call center sends a data retrieval command based on the customer identification value to a contacts service and receives a social profile based on the data retrieval command. Customer service may be provided according to the social profile in response to the request. The call center may submit call center context to the contacts service. The call center context describes the customer service provided in response to the request for customer service.

Example Embodiments

A contacts service stores user profiles with multiple contact addresses. The contacts service may be cloud based (i.e., distributed over or accessed through a network such as the Internet). The multiple contact addresses may include one or more telephone numbers, email addresses, and other messaging addresses. A call center accesses the contacts service to retrieve the user profiles. The contacts service may also allow the call center to post data to the user profiles. The posted data may include call center activities such as a contact history or additional call context. When a user contacts a business, the call center system of that business may query the cloud-based contacts service for the user based on one or more of the multiple contact addresses or information. The contacts service may return the public profile of the user.

An agent or computer at the call center is assigned to the communication from the user. As the communication from the user is answered, the call center system may post transaction details such as call detail records or other relevant context such as a trouble ticket case number to the contacts service. The call detail records are associated to the contact address and/or the user profile.

The contacts service may include one or more policies that define the ability for the call center or other entities the ability to retrieve the user profiles or call detail records. The policies may be defined by a user or by default by the contacts service. The contacts service may give the user access to see the information associated with the user. For example, if the user has communicated with the cable company, the user may be given access to the records of those communications in the contact history at the contacts service. The contacts service history log may be created or updated even though the user did not previously communicate directly with the contacts service. The records appear automatically as the records are populated by the call center system. The user may also be given access to application specific information such as a trouble ticket case number or receipt posted by the business. This eliminates the "please write down your case number" dialog that is common in case driven customer care processes.

Therefore, the contacts service may maintain records across multiple forms of communication for a single user, may integrate records across multiple call centers, and organizes social network data along with data collected by the call center in a centralized location. The contacts service may be updated easily without modification of the software at the call centers. Finally, the user may be given control of the distribution of data through the contacts service.

Figure 1:
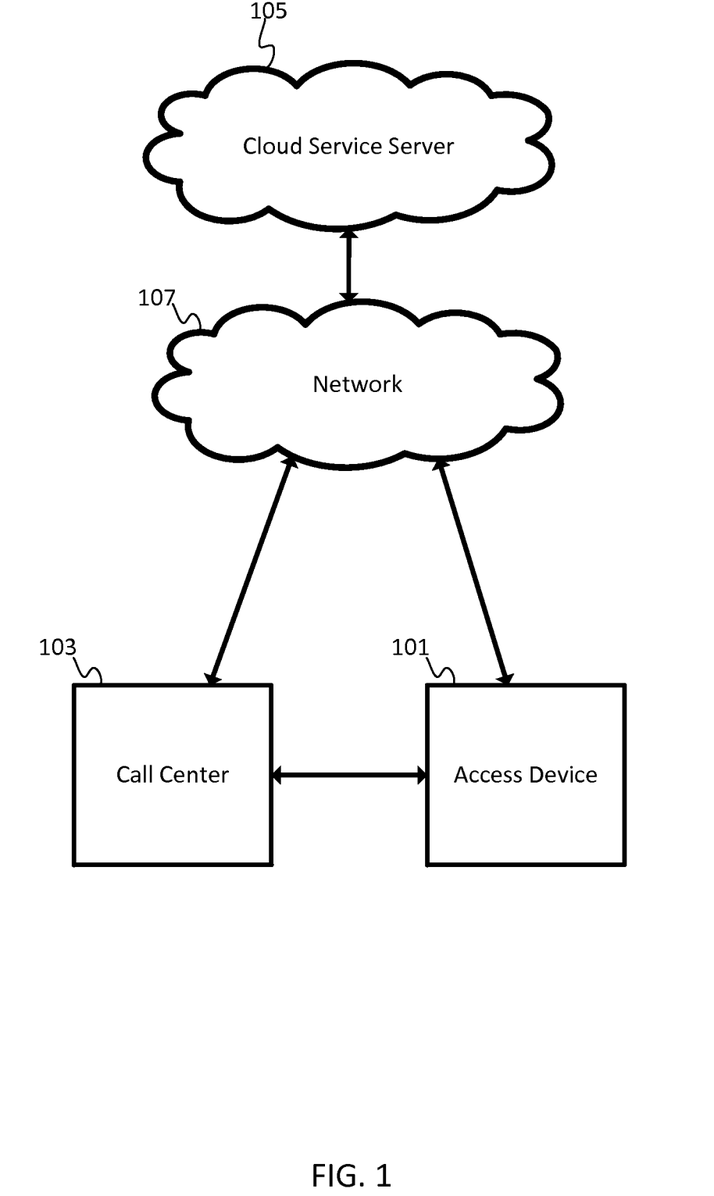
FIG. 1 illustrates an example system for a cloud based contacts service.

FIG. 1 illustrates an example system for a cloud based contacts service. The system includes an access device 101, a call center 103, and a cloud service server 105 connected to the network 107 (e.g., the Internet). Additional, different, or fewer devices may be included in the system. Each of the access device 101, the call center 103, and the cloud service server 105 may include a memory and a processor to perform the following examples.

The access device 101 may be any type of communication device. Example communication devices include fixed line telephones, mobile telephones, laptop computers, desktop computers, personal digital assistants, tablet computers, video game consoles, or other devices. The access device 101 may generate a customer service request for the call center 103. The customer service request may be a phone call, a voice over internet protocol (VoIP) call, an email, a text message, an instant message, form entry, or another communication.

The customer service request may be associated with a customer identification value. In one example, the customer identification value is the phone number, email address, or other address used to send the customer service request, which is effectively generated by the access device 101. In another example, the customer identification value may be generated by the call center 103. In either scenario, the call center 103 sends the customer identification value to the cloud service server 105.

The cloud service server 105 is configured to generate a profile request one or more social networking services for profile information. The profile request may be generated in response to and list the customer identification value. The profile request may be an HTTP get command or the cloud service server 105 may employ a browser to visit a uniform resource locator listed in the profile request. The profile request may be another type of request sent through another communication type of data channel rather than HTTP.

The social networking services may include media sharing services, social graph services, career networking services, microblogs, location based services, or other services. The media sharing services may include websites or other services that allow users to upload photographs, videos, or other media (e.g., YouTube, Flickr, Pinterest). The social graph services may include websites or other services in which people are linked based on social connections (e.g., Facebook, Google+, LinkedIn). The career networking services may include websites or other services focused on career networking and business connections (e.g., LinkedIn). Microblogs are public forums or semi-public forums in which users post messages that may be accessible to other users or businesses (e.g., Twitter). The location based services record and/or publish the geographic location of users (e.g., Foursquare, Facebook, Find My Friends).

In response to receiving the profile request, the social networking services may return profile information to the cloud service server 105. The profile information is metadata that describes the user or actions of the user. The cloud service server 105 may filter, package, or analyze the profile information, which is sent to the call center 103. The call center 103 may also send information back to the cloud service server 105. For example, the call center 103 may collect call context data from interactions with the user. The cloud service server 105 stores the customer context data and the profile information in a cloud service memory and associated with the customer identification value. The call context data, as well as the profile information, may be made available to the call center 103 at a later time and/or other call centers.

Figure 2:
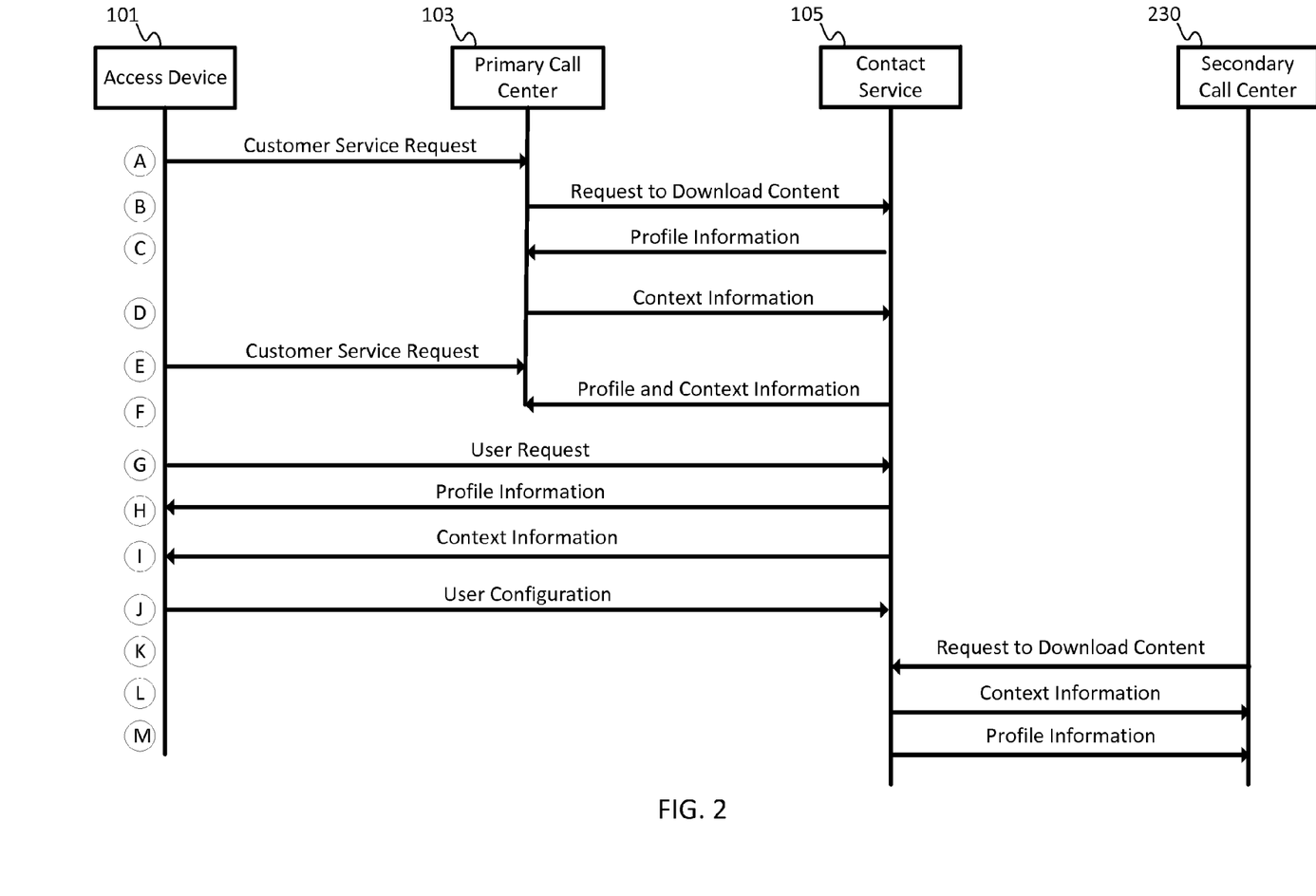
FIG. 2 illustrates an example timing diagram for a customer configured cloud based contacts service.

FIG. 2 illustrates an example timing diagram for a customer configured cloud based contacts service. The cloud service server 105 is in communication with the (primary) call center 103 and the access device 101, as discussed above. In addition, the cloud service server 105 may be in contact with one or more secondary call centers 230. The stages A-M may be performed in the order shown or another order. Additional, different, or fewer stages may be included.

At stage A, the customer service request is sent from the access device 101 to the call center 103. At stage B, the call center 103 sends a query or request to download content from the contacts service. The content may be a contact entry stored at the cloud service server 105.

Figure 3:
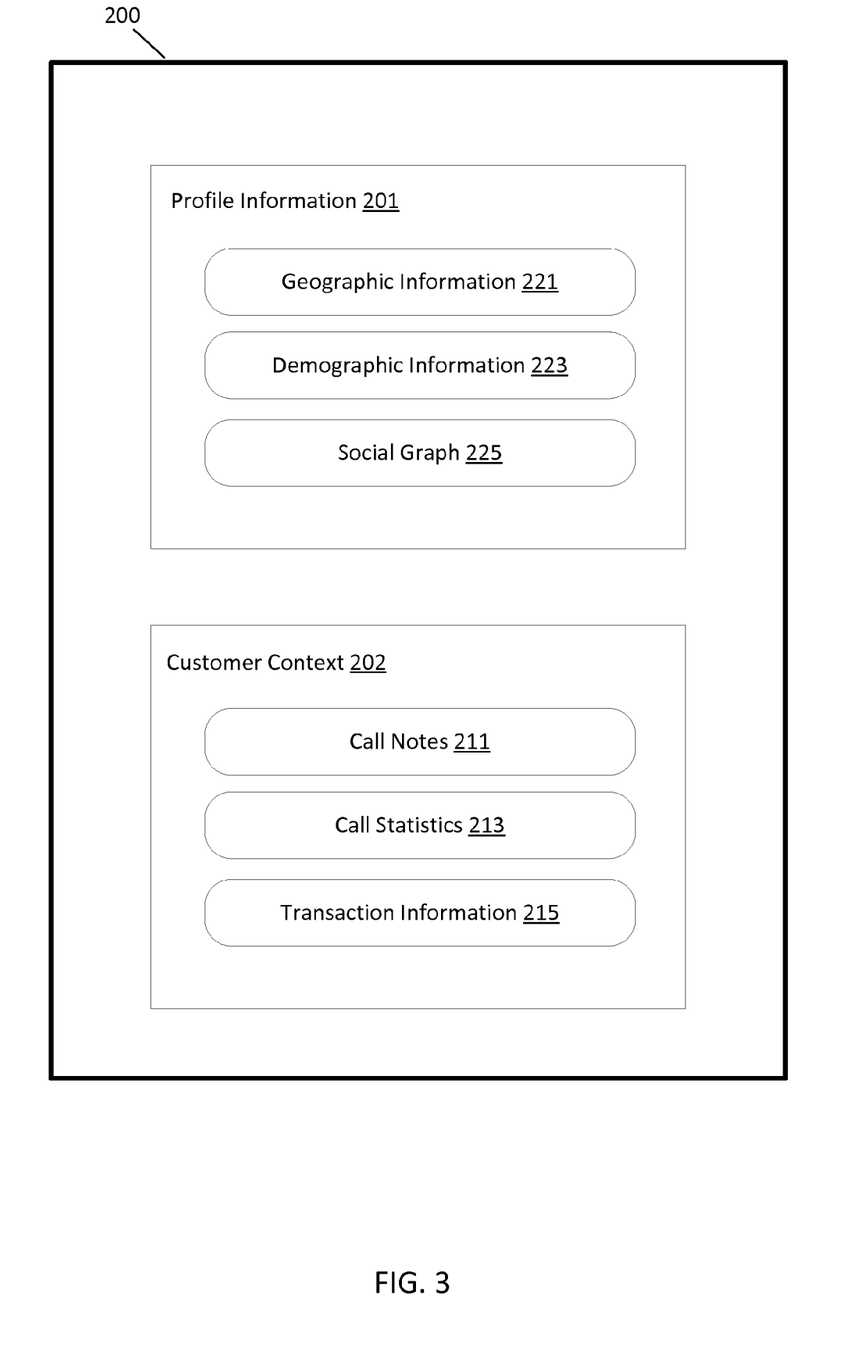
FIG. 3 illustrates an example contacts service entry.

FIG. 3 illustrates an example contacts service entry 200. The contact entry 200 includes profile information 201 and customer context 202. The cloud service server 105 maintains the contact entry based on information received from the social networking services and the call centers.

The profile information 201 may include shared content data, demographic data, a photograph, employment data, location tracking data, education data, relationship data, or other data. The shared content data may include photographs, videos, or other content uploaded to the social networking services. The demographic data may describe information on the user such as age, birthdate, home town, home country, one or more languages spoken, or other data. The employment data may include one or more current employer and one or more past employers. The location data may describe points of interest or other location data indicative of geographic locations where the user has "checked-in" or been tracked. The education data may include one or more colleges, universities, or other education institutions that the user has attended. The relationship data may describe a relationship status of the user such as single, in a relationship, married, engaged, separated, divorced or another relationship status.

In some examples such as telephone numbers, usernames, and email addresses, the customer identification value may be used to directly query the social networking services. In other examples, the cloud service server 105 includes a lookup table that associates a username for one or more social networking services with the customer identification values. The cloud service server 105 queries the lookup table using the customer identification value to retrieve a username for a website or social networking service.

At stage C, the profile information 201 is sent to the call center 103 from the cloud service server 105. The profile information 201 may be displayed on a screen at an agent device. The call center 103 may use the profile information 201 for one or more of routing the communication, establishing a relationship with the customer, selecting content, or customizing options for the customer.

The profile information 201 may be used for routing the communication or phone call. For example, call center 103 may match an agent to the communication based on the profile information 201. For example, the agent may be matched based on one or more of demographic information, employment data, location tracking data, education data, or relationship data. In one example, an agent from a home town near the home town of the caller is selected. In another example, an agent near the same age as the caller is selected. In another example, an agent having a similar educational background as the caller is selected. In another example, the technical abilities or familiarity with a product or service is inferred from the employment data. For example, when the call center 103 routes calls for technical support with a blood pressure monitor and the employment data indicates the caller is a nurse, the call is routed to an experienced agent because if a nurse is having difficult with the blood pressure monitor, a novice agent may be of little assistance.

The profile information 201 may be used for establishing a relationship with the customer. For example, the profile information 201 may be provided to an agent for making small talk with the customer. The agent may ask the customer questions related for demographic information, employment data, location tracking data, education data, or relationship data. In a related example, the agent may customize or adjust a sales pitch according to the profile information 201.

The profile information 201 may be used for selecting content for the customer. The call center 103 may provide content to the user. The content may include technical support, instructions, or other information. The call center 103 may tailor the content to the experiences, abilities, or training of the customer as inferred from the profile information 201 based on one or more of demographic data, a photograph, employment data, location tracking data, education data, relationship data, or other data. For example, the customer's age may be determined from the demographic data or photograph, and the call center 103 may provide child instructions for younger customers and adult instructions for older customers. In another example, the employer or education of the customer may be determined, and the call center 103 selects a technically novice set of instructions for non-technically employed or educated customers and a technically advanced set of instructions for technically employed or educated customers.

The profile information 201 may be used for customizing options for the customer. The options may be provided using an interactive voice response (IVR) or touch tone system. For example, a technically advanced set of options may be selected for technically employed or educated customers and a novice set of options may be selected for less technically advanced customers based on demographic data, a photograph, employment data, location tracking data, education data, relationship data, or other data. In another example, the customer's attention span may be inferred from the profile information 201 (e.g., based on age, education, or other factors), and the call center 103 selects one or more dimensions of the menu system as a function of the profile information 201. Example dimensions of the menu system include vertical size (number of levels in the menu system) and horizontal size (number of choices per level in the menu system).

The order of menu choices may be adjusted as a function of the profile information 201. For example, when the primary language can be determined from the profile information 201, the menu system may order available languages with the primary language first. In addition or in the alternative, the menu system may default to the primary language.

At stage D, the call center 103 returns customer context to the cloud service server 105, which provides a contracts service (e.g., contacts service 105). The customer and the call center 103 interact. In the case of an incoming email, the interaction may entail an agent of the call center 103 reading and processing the email. In the case of a telephone call, the interaction may include IVR responses and/or conversation between the call center agent and the user. Based on one or more of these interactions, customer context data is recorded.

The customer context data may include statistical information, user supplied information, agent supplied information, and transaction information. The statistical information may include a call log. The statistical information may include a time stamp and/or date stamp associated with the customer service request. The user supplied information may include selections from the menu system or information provided to the menu system. The information may include names, addresses, contact addresses, or username information for social network services. The agent supplied information may include notes that the agent recorded during or regarding the call with the user. The transaction information may include data related to a current or past transaction with the caller.

The transaction information may include order data (e.g., shipping information, payment information, product codes, or other data). The transaction information may include a receipt, a confirmation number or a transaction number for the customer. For a purchase of goods or services, the transaction number may reference the purchase. For a technical support call, the confirmation number may reference the help ticket for service. In one example, the transaction information includes size data for an item ordered such as clothing. The size is included in the customer context 202 that may be provided in response to subsequent customer service requests.

At stage E, the access device 101 sends a subsequent customer service request to the call center 103. While not shown, the call center 103 may perform a similar request for data as in stage B from the contacts service 105. Because context information has already been collected, the contacts service 105 may respond with both the profile information and the context information, as shown by stage F.

At stage G, the access device 101 may request information directly from the contacts service 105. For example, the access device 101 may establish a login account with the contacts service 105. The login account may be based on the customer identification value for the user. The contacts service 105 is configured to provide the profile information, as shown in stage H, and/or context information, as shown in stage I. The user may be asked to confirm the accuracy of the information or provide additional information.

Figure 4:
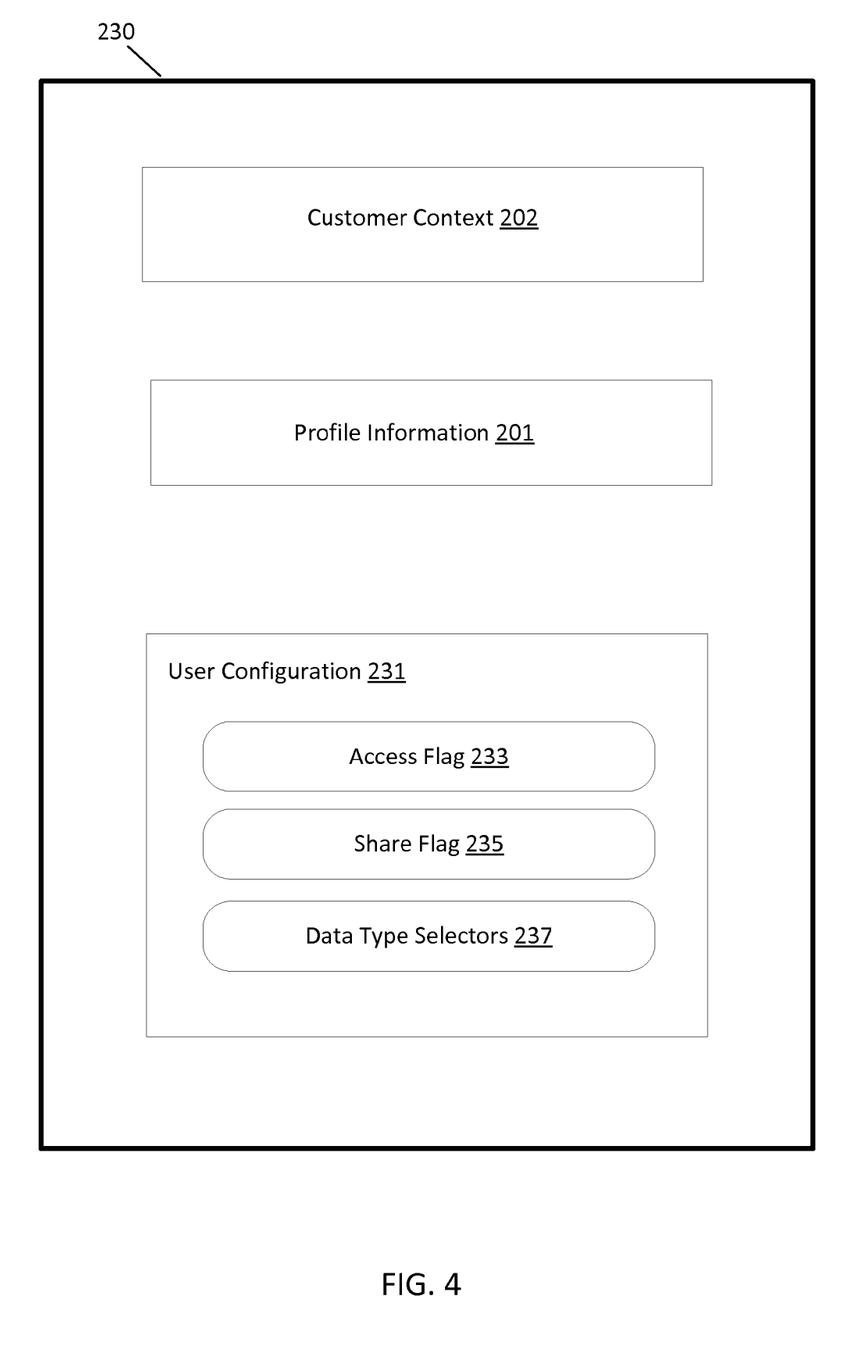
FIG. 4 illustrates an example contacts service entry and user configuration.

At stage J, the access device 101 may provide a user configuration to the contacts service 105. FIG. 4 illustrates an example contacts service entry (e.g., profile information 201 and customer context 202) and a user configuration 231. The user configuration 231 includes one or more of an access flag 233, a share flag 235, and a data type selector 237.

The user configuration 231 may define access to the customer context data or the profile information. For the context data, the user configuration 231 may distinguish between the contributing device (e.g., call center 103) and other devices (e.g., secondary call center 240). In one example, the access flag 233 defines whether the call center 103 is given access to the customer context data from the call center at a later time. In another example, the share flag 235 defines whether other entities are given access the customer context data from the call center at a later time. The access flag 233 and the share flag 235 may be a single character or bit that provides or denies access. The access flag 233 and the share flag 235 may include one or more alphanumeric characters stored at the contacts service 105 that list IP addresses, domain names or device names that have access to the customer context data.

At stage K, the secondary call center 230 sends a request to download content to the contacts service 105. The contacts service 105 may access the user configuration to determine whether the secondary call center 230 should have access to the context information and/or the profile information, which may be transferred to the secondary call center 230 from the contacts service 105. Additional call centers or devices may follow similar procedures to access the context information and/or the profile information.

The secondary call center 230 may be affiliated with the call center 103 or independent. The contacts service 105 may have relationships with multiple call centers. In one example, the contacts service 105 keeps this context information 202 confidential so that other users of the service would not have access to user calling patterns. In another example, the contacts service 105 may aggregate and provide analysis of the context information across multiple users. The analysis may categorize customer service request according to demographic information. The contacts service 105 may provide generalized information according to demographic, such as the average time and variance for the customer service requests. In one example, a bank may request that the contacts service 105 provide information related to the typical time of day that 25-30 year-old customers call the bank.

The contacts service 105 may provide generalized information according to employment data, such as the average time and variance for the customer service requests for particular employers or professions. In one example, a cable provider may request data for when service professionals call for technical service.

The contacts service 105 may provide data to a business about their competitors. The contacts service 105 may receive a request from company X about the call patterns for company Y. For example, the cable company may be interested in whether a customer with a recent customer service request for the cable company has recently communicated with a competitor cable company or a satellite company.

Figure 5:
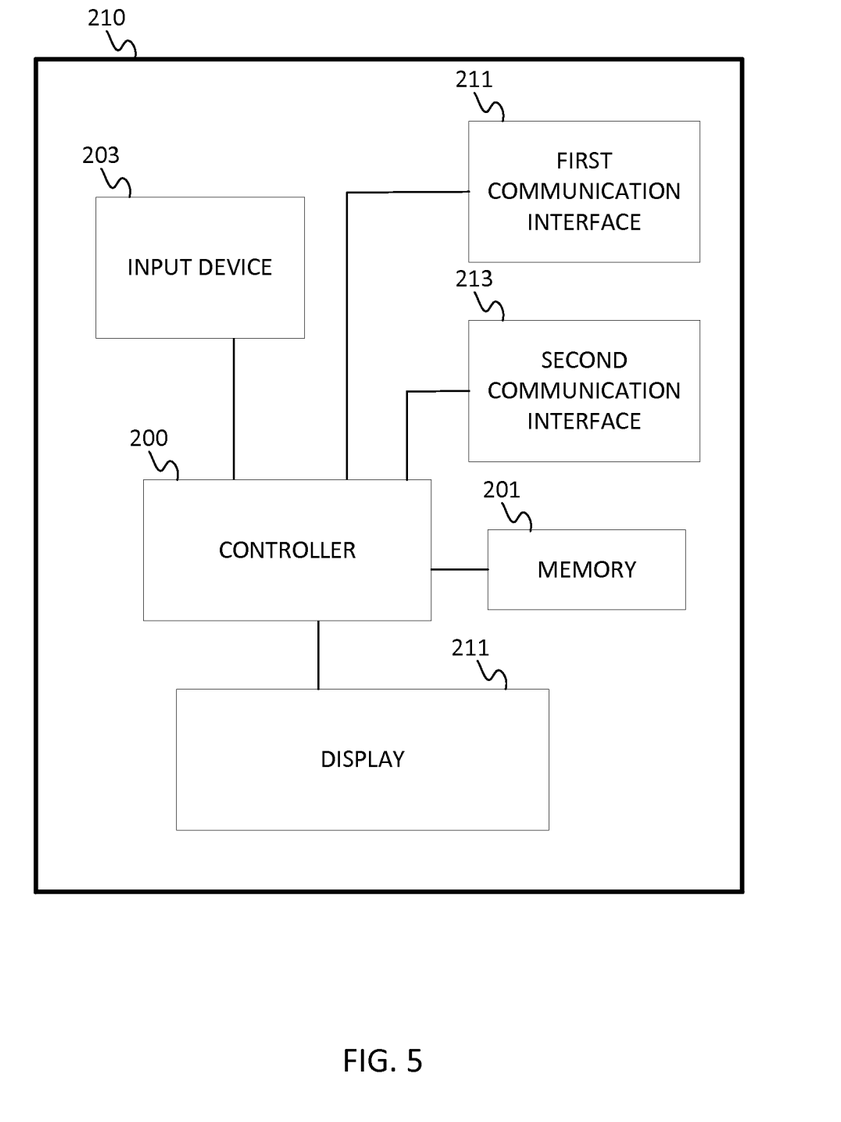
FIG. 5 illustrates an example access device for the system of FIG. 1.

FIG. 5 illustrates an example computing device 210 of the call center 103 for the systems of FIG. 1. The computing device 210 includes a controller 200, a memory 201, an input device 203, a first communication interface 211, a second communication interface 213, and a display 211. Additional, different, or fewer components may be provided. Different network devices may have the same or different arrangement of components.

The computing device 210 may include only the first communication interface 211 or both the first communication interface 211 and the second communication interface 213. For example, when the computing device 210 is a land line telephone, only the first communication interface 211 is included. However, when the computing device 210 is a computer, a smartphone, or a tablet, both interfaces and/or additional interfaces are included. Different interfaces may be assigned to wireless (the IEEE 802.11 family of protocols), cellular communications, voice of internet protocol (VoIP), email, instant messaging, session initiation protocol (SIP), extensible messaging and presence protocol (XMPP), microblog submissions (Twitter or status messages), other forms of communication.

Figure 6:
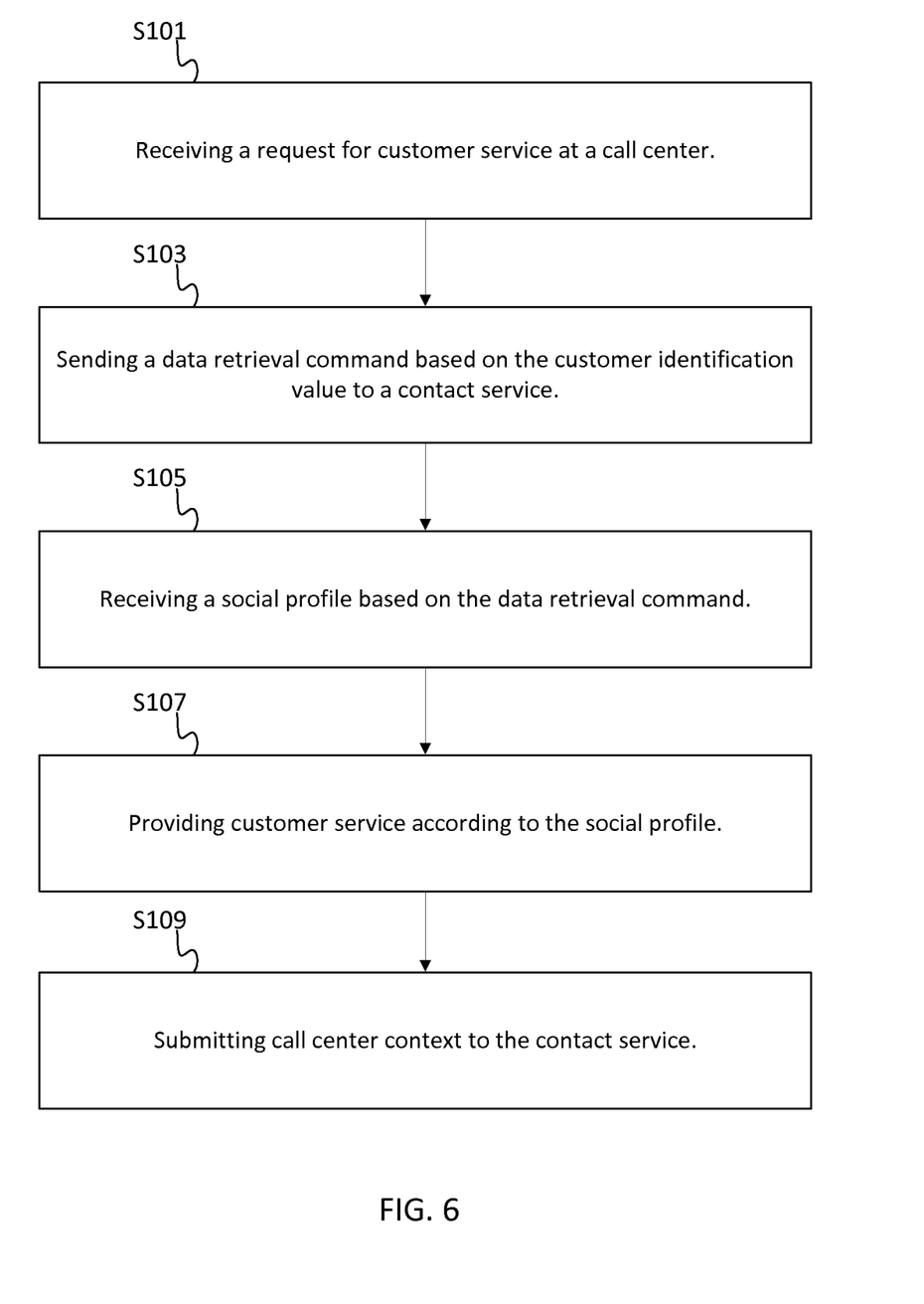
FIG. 6 illustrates an example flowchart for a process performed by the example access device of FIG. 5.

FIG. 6 illustrates an example flowchart for the computing device 210 of FIG. 5. Additional, different, or fewer acts may be provided. The acts are performed in the order shown or other orders. The acts may also be repeated.

At act S101, a communication interface receives a request for customer service at the computing device 210. Each type of communication may use an address or identifier. For example, telephone communication is tied to a phone number (e.g., caller identification), VoIP is tied to an IP address, email is tied to an email address, instant messaging is tied to a username, SIP is tied to a uniform resource locator or other address, XMPP is tied to an address, and microblog submissions are tied to a username or address. One of the communication interfaces may send a customer service request including a corresponding identifier.

At act S103, the controller 200 generates a data retrieval command based on the identifier, which is sent to a contacts service. The controller 200 may include the identifier from the user in the data retrieval command. Alternatively, the memory 201 may include a lookup table that associates the identifier with possible usernames. The usernames may be associated with one or more social networking services or websites.

At act S105, the second communication interface 213 receives a social profile based on the data retrieval command. As discussed above, the social profile may include shared content data, demographic data, a photograph, employment data, location tracking data, education data, relationship data, or other data.

At act S107, the controller 200 may provide customer service according to the social profile. In one example, the social profile is displayed by display 211 and the agent makes customer service decisions or routing decisions based on the social profile. The controller 200 may receive agent data from the input device 203. The agent may take information from the caller regarding the reasons for the customer service call. The agent may enter information regarding a purchase or other transaction from the customer service call.

At act S109, the controller 200 may submit the call center context to the contacts service 105. The contacts service 105 may associate the call center context with the social profile as updated over time. The call center context may include request details such as the time the request was made (timestamp for the email, call, instant message, or other communication), communication history (time and quantity of other communications), or other statistical data. The call center context may include information entered by the user through the menu system or through a voice recording. The call center context may include notes that the agent recorded during or regarding the call with the user. The call center context may include order data (e.g., shipping information, payment information, product codes, or other data). The transaction information may include a receipt, a confirmation number or a transaction number for the customer. For a purchase of goods or services, the transaction number may reference the purchase. For a technical support call, the confirmation number may reference the help ticket for service.

The input device 203 may be one or more buttons, keypad, keyboard, mouse, stylist pen, trackball, rocker switch, touch pad, voice recognition circuit, or other device or component for inputting data to the access device 101. The input device 203 and the display 211 may be combined as a touch screen, which may be capacitive or resistive. The display 211 may be a liquid crystal display (LCD) panel, light emitting diode (LED) screen, thin film transistor screen, or another type of display. The display 211 is configured to display the first and second portions of the content.

Figure 7:
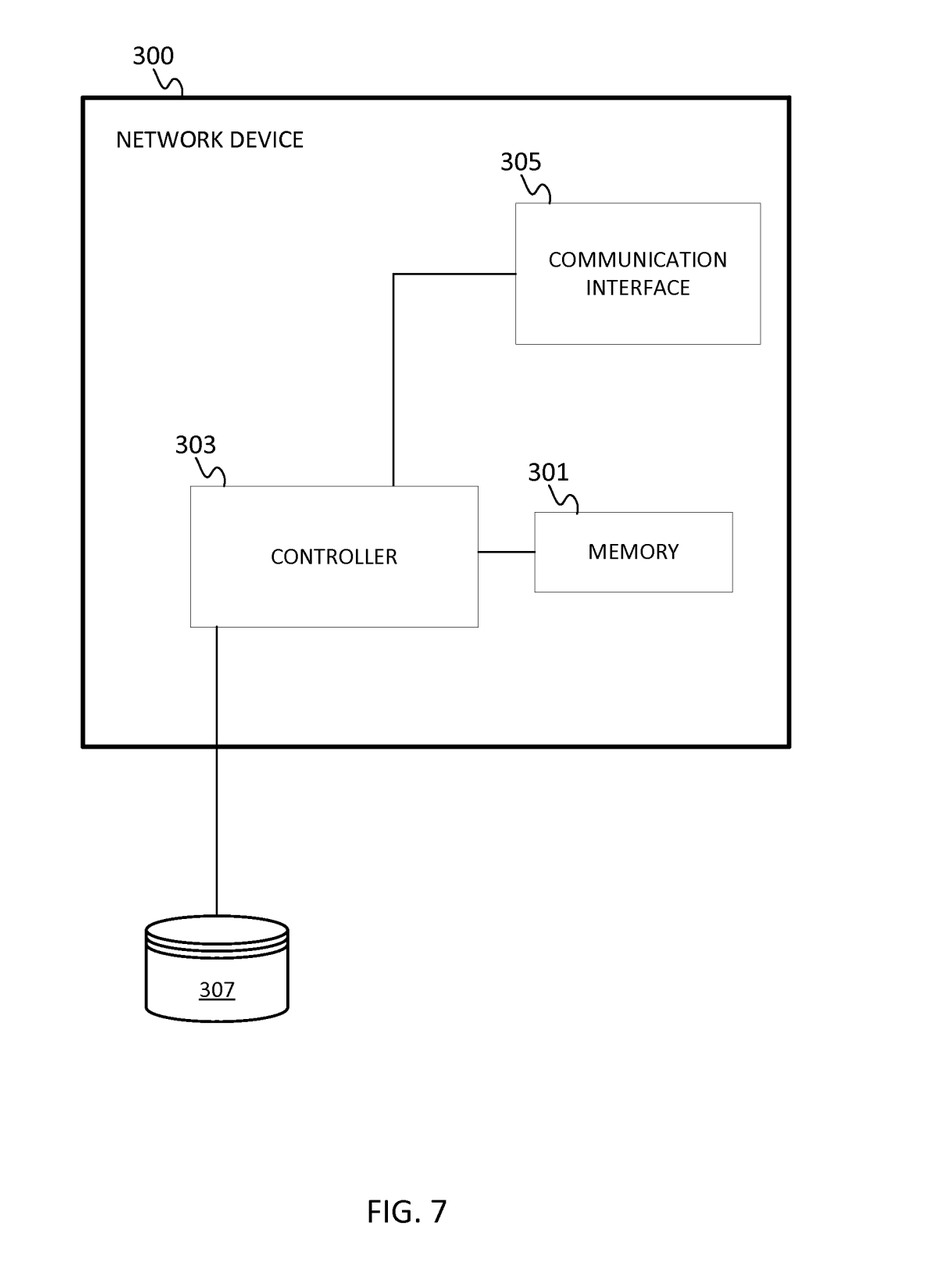
FIG. 7 illustrates an example network device for the system of FIG. 1.

FIG. 7 illustrates an example network device 300 for the system of FIG. 1. The network device 300 may execute the contacts service 105. The network device 300 includes at least a memory 301, a controller 303, and a communication interface 305. In one example, a database 307 stores the profile information and call context information. Additional, different, or fewer components may be provided. Different network devices may have the same or different arrangement of components.

Figure 8:
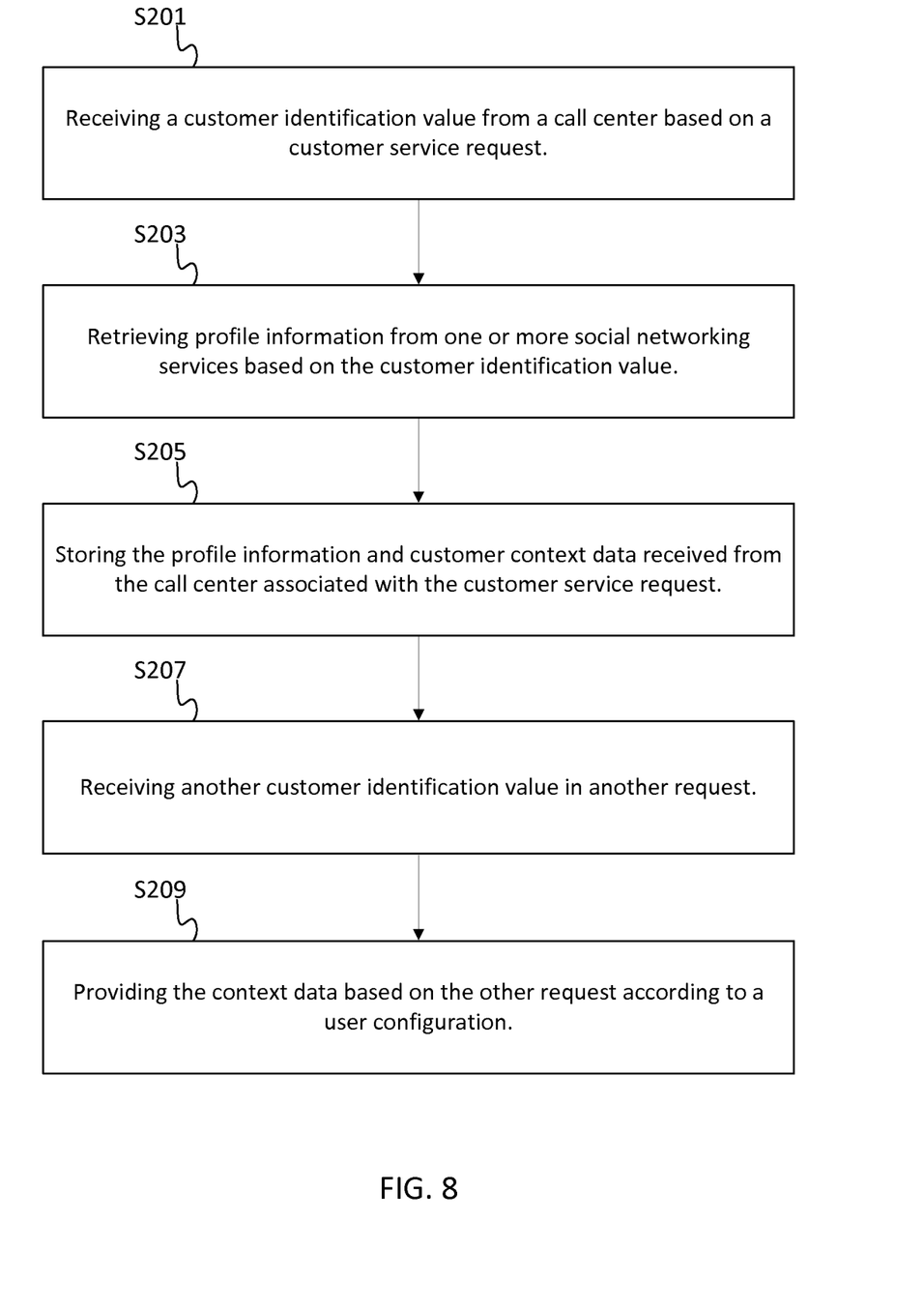
FIG. 8 illustrates an example flowchart for a process performed the network device of FIG. 5.

FIG. 8 illustrates an example flowchart for the network device 300. Additional, different, or fewer acts may be provided. The acts are performed in the order shown or other orders. The acts may also be repeated.

At act S201, the controller 303 or communication interface 305 of the cloud service server 105 receives a customer identification value from a call center based on a customer service request received at the call center. The customer identification value may be automatically received from the call center when the customer's account is access by an agent.

At act S203, the controller 303 retrieves profile information from one or more social networking services based on the customer identification value. The controller 303 provides the profile information to the call center. The profile may be directly displayed to the agent at the call center. The agent may use the information in the profile to select a strategy for addressing the customer service needs of the customer. The agent may refer the customer to another agent based on the information of the profile. In one example, a script or a set of technical instructions for the customer is selected based on analysis of the profile. The analysis may be a function of one or more of age, education, and location.

At act S205, the controller 303 stores in memory 301 the profile information and customer context data received from the call center associated with the customer service request.

The customer context may be automatically sent by the call center (e.g., the customer context data may be the customer's entry at the call center). The customer context data may be specifically chosen by the agent as information the call center is willing to share or willing to share for a fee or trade of information. Example data may include times of availability for the customer, sales history, or financial information.

At act S207, the controller 303 receives another customer identification value from a call center based on a customer service request received at the call center. The call center may be the same or different as the call center in act S201. This customer identification value may be the same or different as in act S201. If different, the customer identification values may be associated with different accounts of the same user.

The database 307 may store data for multiple accounts tied to a single user. Each account includes a customer identification value or other type of contact address stored (or created). The entry for a user may connect the multiple accounts and their associated customer identification values along with profile information and context information.

The database 307 may compile a record of communication across multiple accounts and multiple formats. For example, a customer emails the cable company, the call center system queries the cloud-based contacts service and posts a record of receiving the email. The email is put in queue for service. Several hours later, the email is still in queue and the customer calls the cable company by phone. The call center system queries the cloud-based contacts service to post a record of the call. The query also requests a history of communications to the cable company from other addresses and the service responds to inform that the user calling is the same profile of the user that emailed previously. Therefore, the controller 303 provides the call center 103 with cross-channel customer contact tracking by leveraging a contacts profile maintained by the user.

At act S209, the controller 303 provides the context data based on the other request according to a user configuration. The user may be able to define multiple access levels. The controller 303 may establish permission or settings for the customer context data. The settings may establish an access level for the originating call center, an access level for additional call centers, and/or an access level for marketing firms.

In one example, the access device 101 may be configured to select a privacy mode with the contacts service server 105. The privacy mode may prevent in data from leaving the contacts service server 105. For example, even if call center 103 collected the user's shirt size and mailing address, the contacts service server 105 does not permit the call center 103 to subsequently access this information. Thus, additional privacy is available to the user.

In another example the access device 101 may be configured to select a normal mode with the contacts service server 105. The normal mode permits data to flow back and forth between the contacts service server 105 and the call center 103. However, no other call centers are given access to the data collected by the call center 103.

In another example the access device 101 may be configured to select an open mode with the contacts service server 105. The open mode permits data to be shared between the contacts service server 105 and other data centers or call centers. The access device 101 may specify specific types of call centers that may have access to the data in a configuration command. The access may be given by category (e.g., research, retailers, trusted partners, or other types), by name, or by IP address.

In another example, the access device 101 may be configured to select a marketing mode with the contacts service server 105. In the marketing mode, the access device 101 may permit data to be sold to marketing firms. The user of the access device 101 may be compensated with a portion of the funds received for the data or with a coupon or other incentive. The compensation may be directly applied to an account at the call center 103, which may be applied to subsequent purchases by the user.

This value of data to call centers to use the service increases as more call centers use the service the value of the data to the cloud-based contacts service provider increases exponentially. For example, on day one of using the service the first call center may begin identifying repeat calls. If a customer calls in the morning and then calls back later in the same day, the call center system can act differently for the second call based on data collected earlier. This feature is provided even if the cloud-based service is brand new and it has no user profiles. If the service is added to an existing/active cloud-based contacts service, then the initial feature set may include public profile information displayed to first time callers. The service becomes more valuable to the cloud-based contacts service provider over time as more call centers use the service. There is a network effect applied to the value of the overall data that is stored in the cloud-based contacts service.

The controllers 200 and 303 may include a general processor, digital signal processor, an application specific integrated circuit (ASIC), field programmable gate array (FPGA), analog circuit, digital circuit, combinations thereof, or other now known or later developed processor. The controllers 200 and 303 may be a single device or combinations of devices, such as associated with a network, distributed processing, or cloud computing.

The memories 201 and 301 may be a volatile memory or a non-volatile memory. The memories 201 and 301 may include one or more of a read only memory (ROM), random access memory (RAM), a flash memory, an electronic erasable program read only memory (EEPROM), or other type of memory. The memories 201 and 301 may be removable from the network device 300, such as a secure digital (SD) memory card.

In addition to ingress ports and egress ports, the communication interface may include any operable connection. An operable connection may be one in which signals, physical communications, and/or logical communications may be sent and/or received. An operable connection may include a physical interface, an electrical interface, and/or a data interface.

The network may include wired networks, wireless networks, or combinations thereof. The wireless network may be a cellular telephone network, an 802.11, 802.16, 802.20, or WiMax network. Further, the network may be a public network, such as the Internet, a private network, such as an intranet, or combinations thereof, and may utilize a variety of networking protocols now available or later developed including, but not limited to TCP/IP based networking protocols.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored. The computer-readable medium may be non-transitory, which includes all tangible computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and anyone or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination.

Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

I claim:

1. A method comprising:
    receiving, at a cloud service server, a customer identification value from a call center;
    generating, by a processor, a profile request for one or more social networking services for profile information based on the customer identification value;
    sending the profile information to the call center;
    receiving customer call center data from the call center;
    storing the customer call center data and the profile information in a memory of the cloud service server and associated with the customer identification value; and
    receiving a user input from a user associated with the customer identification value, the user input defining access to the customer call center data,
    wherein the user input includes a share flag that defines whether other entities are given access to the customer call center data from the call center.

2. The method of claim 1, wherein the user input includes an access flag that defines whether the call center is given subsequent access to the customer call center data from the call center.

3. The method of claim 1, further comprising:
    receiving an access request from the user associated with the customer identification value; and
    providing the customer call center data to the user in response to the access request.

4. The method of claim 1, wherein the customer call center data is related to a product purchased via the call center.

5. The method of claim 1, wherein the customer call center data includes a transaction code or a receipt.

6. The method of claim 1, wherein the customer identification value is associated with a telephone number and another contact address, and the call center is configured to send the customer identification value based on customer service requests made via the telephone number and via the other address.

7. The method of claim 1, wherein the call center is a first call center, the method further comprising:
    sending the customer context data from the first call center to a second call center.

8. An apparatus comprising:
    a communication interface configured to receive a customer identification value from a first call center based on a customer service request;
    a processor configured to retrieve profile information from one or more social networking services based on the customer identification value and provide the profile information to the first call center; and
    a memory configured to store the profile information and customer context data received from the first call center associated with the customer service request,
    wherein the communication interface is configured to receive a user request from a user associated with the customer identification value, the user request being for the customer context data to be received from the call center, wherein the user request includes a share flag that indicates whether a second call center is given access to the customer context data received from the first call center.

9. The apparatus of claim 8, wherein the customer context data includes notes taken by an agent of the call center.

10. The apparatus of claim 8, wherein the customer context data includes a ticket number for technical service for the customer service request or a transaction code for a purchase for the customer service request.

11. The apparatus of claim 8, wherein the customer context data includes communication statistics associated with the customer service request.

12. The apparatus of claim 8, wherein the communication interface is configured to receive a user input defining access to the customer context data or the profile information.

13. The apparatus of claim 8, wherein the customer identification value is associated with a telephone number and another contact address such that the call center sends the customer identification value based on customer service requests made via the telephone number and customer service requests made via the other address.

14. The apparatus of claim 8, wherein the profile information includes demographic data, a photograph, employment data, location tracking data, or education data.

15. The apparatus of claim 8, wherein the call center is a first call center, and the processor is configured to send the customer context data from the first call center to a second call center.

16. A method comprising:
    receiving a request for customer service at a first call center, wherein the request includes a customer identification value;
    sending a data retrieval command based on the customer identification value to a contacts service;
    receiving a social profile based on the data retrieval command;
    providing customer service according to the social profile in response to the request for customer service; and
    submitting call center context to the contacts service, wherein the call center context describes the customer service provided in response to the request for customer service,
    wherein a flag associated with the customer identification value determines whether or not access to the first call center context is accessible from outside of the first call center, the flag being defined by a user request received by the contacts service from a user associated with the customer identification value; and sending the customer context data from the first call center to a second call center according to the flag.

17. The method of claim 16, further comprising:

routing the request for customer service based on the social profile.

18. The method of claim 16, wherein the call center context includes data provided to the call center from the user associated with the customer identification value sending the request for customer service.

19. The method of claim 16, wherein the call center context includes data provided by an agent handling the request for customer service at the call center.

* * * * *